United States Patent [19]

Pocholle et al.

[11] Patent Number: 4,906,949
[45] Date of Patent: Mar. 6, 1990

[54] MONOMODE OPTICAL SOURCE AND AN OPTICAL AMPLIFYING DEVICE TUNEABLE IN THE NEAR INFRA RED AND APPLICATION TO SELECTIVE AND REGENERATION AMPLIFYING DEVICES

[75] Inventors: Jean P. Pocholle, Sainte Genevieve des Bois; Jean Raffy, Crosne; Michel Papuchon, Issy-les-Moulineaux, all of France

[73] Assignee: Thomson-CSF, Paris, France

[21] Appl. No.: 243,128

[22] Filed: Sep. 7, 1988

Related U.S. Application Data

[63] Continuation of Ser. No. 797,519, Nov. 13, 1985, abandoned.

[30] Foreign Application Priority Data

Nov. 16, 1984 [FR] France ................. 84 17556

[51] Int. Cl.$^4$ ............................. G02B 6/26; H03F 7/00
[52] U.S. Cl. ...................................... 330/4.3; 307/425; 330/4.5; 372/20; 350/96.13; 374/162
[58] Field of Search ................ 455/610, 611; 332/4

[56] References Cited

U.S. PATENT DOCUMENTS

| | | | |
|---|---|---|---|
| 3,609,586 | 9/1971 | Danielmeyer | 350/160 |
| 3,665,338 | 5/1972 | Harris et al. | 372/21 |
| 3,858,056 | 12/1974 | Melamed et al. | 307/425 |
| 3,875,422 | 3/1971 | Stolen . | |
| 4,255,017 | 3/1981 | Hasegawa | 350/96.29 |
| 4,355,910 | 10/1982 | Quick et al. | 374/162 |
| 4,673,299 | 6/1987 | Dakin | 374/161 |

OTHER PUBLICATIONS

Pocholle et al, "Optical Amplification Based . . . ", 5/17/84, pp. 194–196, ESI Public. of Opto 84, Paris France, abst. only.
Findakly et al, "Thermo-Optic Phase . . . ", 4/26/84, PP th B 511-4, Opt. Soc. Amer., 1984, abst. only.
Optics Letters, vol. 6, no. 5, May 1981, pp. 213–215, Optical Society of America, New York, U.S.; R. H. Stolen et al: "Phase matching in birefringent fibers".
Applied Physics Letters, vol. 36, no. 3, Feb. 1980, pp. 178–180, American Institute of Physics, New York, U.S.; N. Uesugi: "Parametric difference frequency generation in a three-dimensional LiNbO3 optical waveguide".
Applied Physics Letters, vol. 45, no. 8, Oct. 1984, pp. 823–825, American Institute of Physics, New York, U.S.; Masataka Nakazawa et al.: "Efficient multiple visible light generation in a polarization-preserving optical fiber pumped by a 1.064-mumyttrium aluminum garnet laser".

Primary Examiner—Nelson Moskowitz
Attorney, Agent, or Firm—Oblon, Spivak, McClelland, Maier & Neustadt

[57] ABSTRACT

The source and the device comprise a generator of a pump wave, optical means for coupling with a monomode optical fiber for guiding and highly confining the pump wave so that a four photon non linear interaction is created. At least one section of this optical fiber is disposed in a thermostat controlled enclosure associated with a temperature control device so as to obtain continuous tuning in a range of frequencies belonging to the near infra red spectrum.

8 Claims, 5 Drawing Sheets

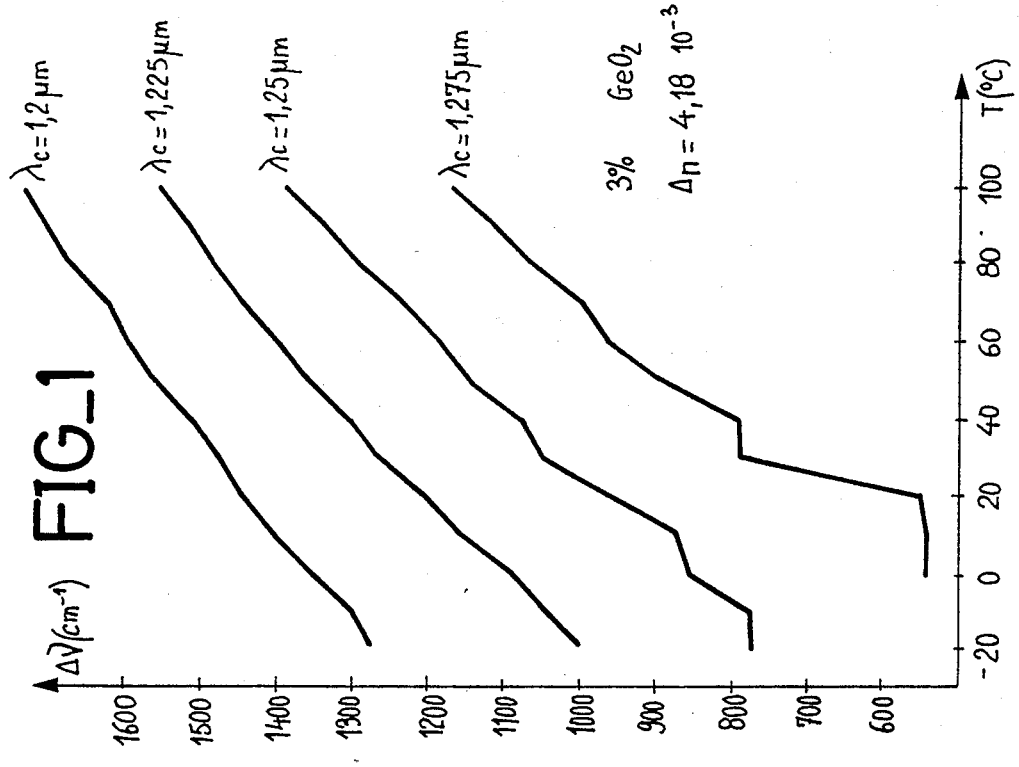
FIG_1
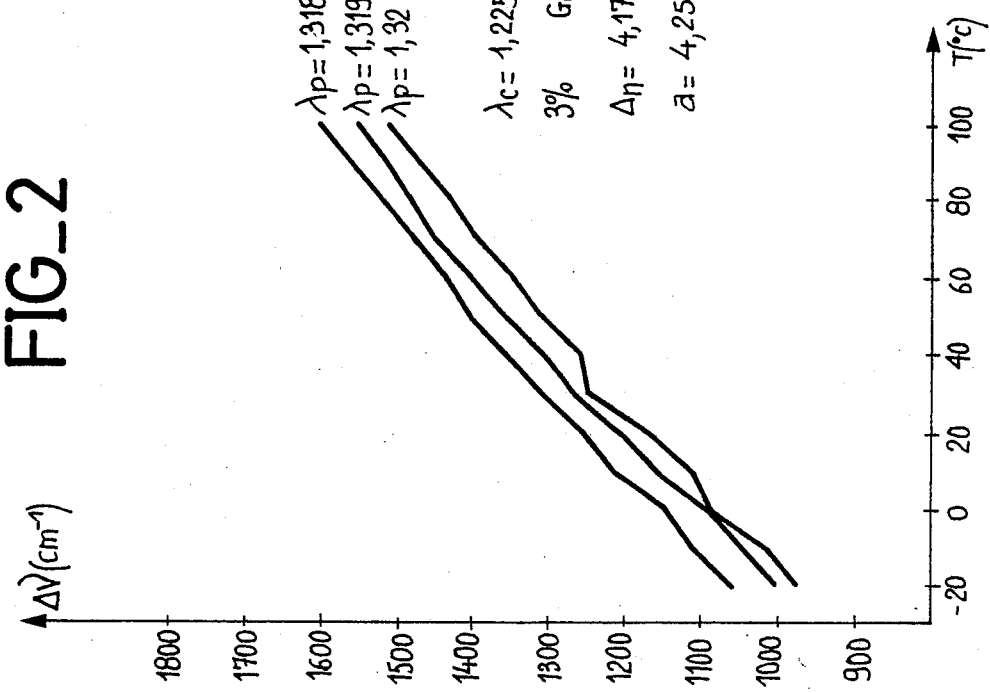
FIG_2

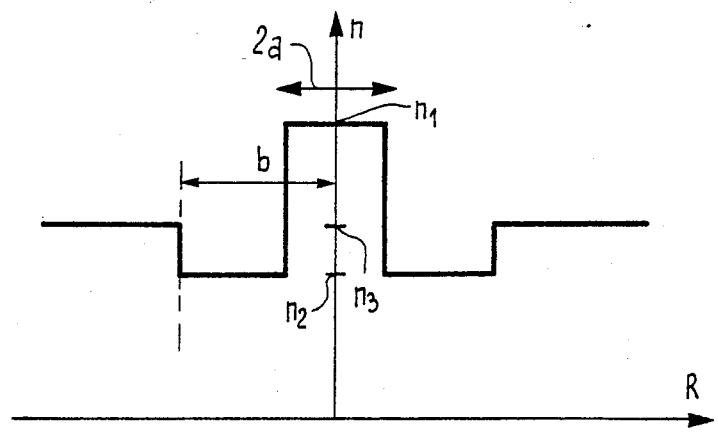
FIG_3
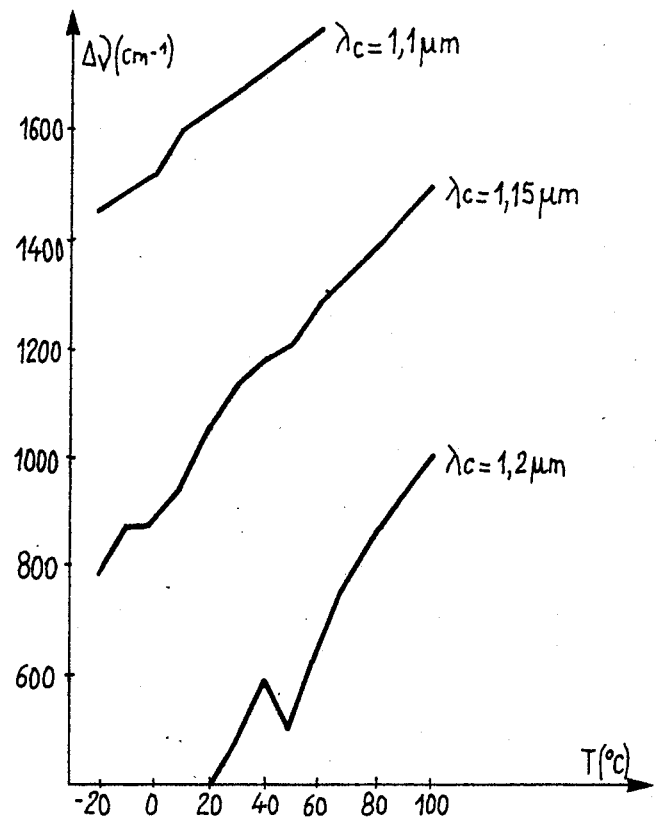
FIG_4

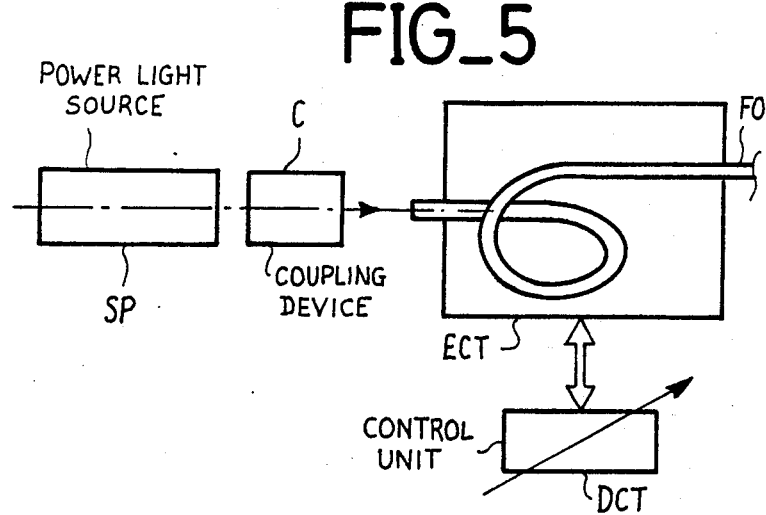
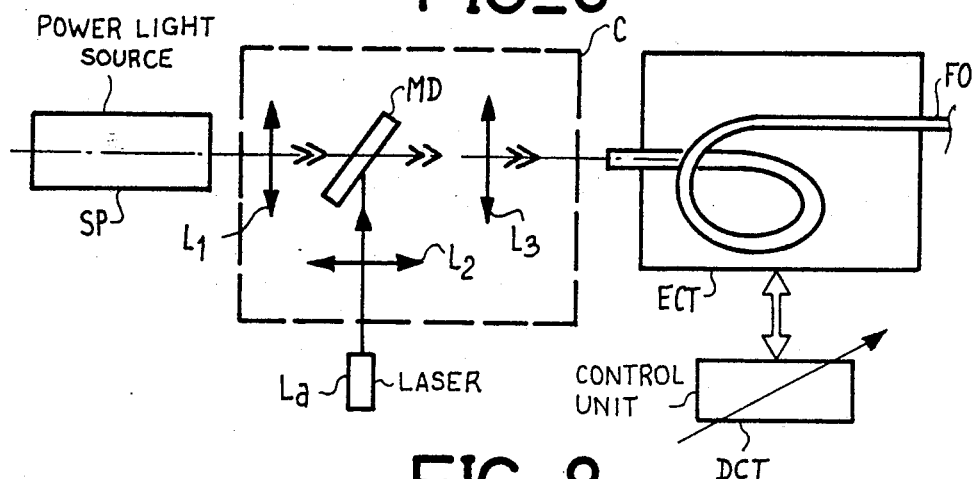
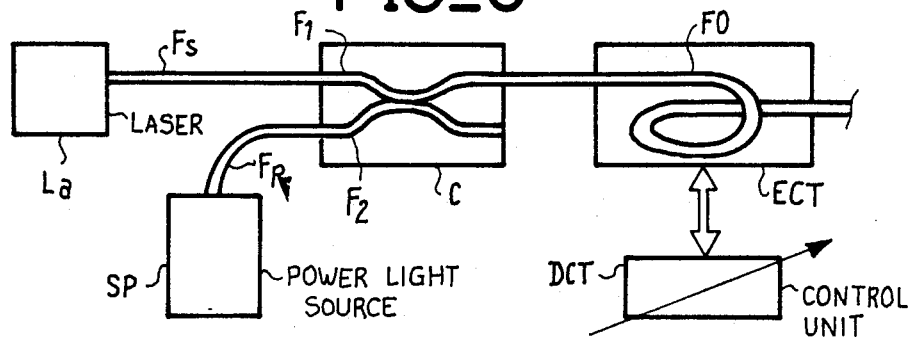

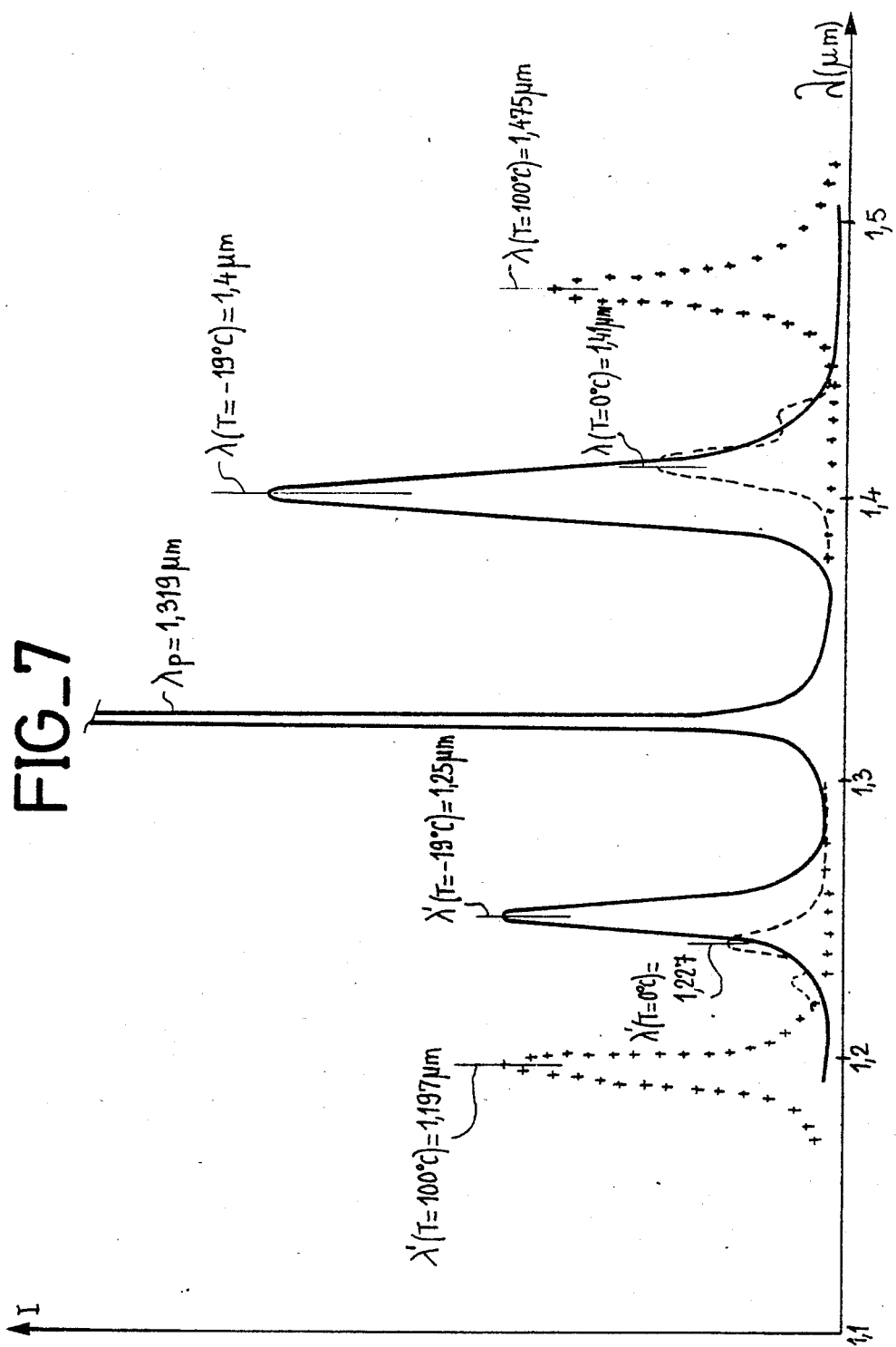
FIG_7

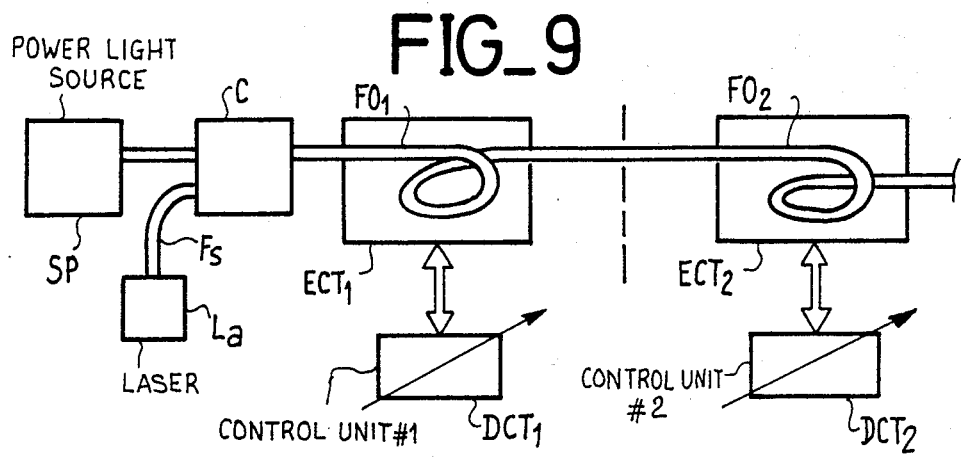
FIG_9
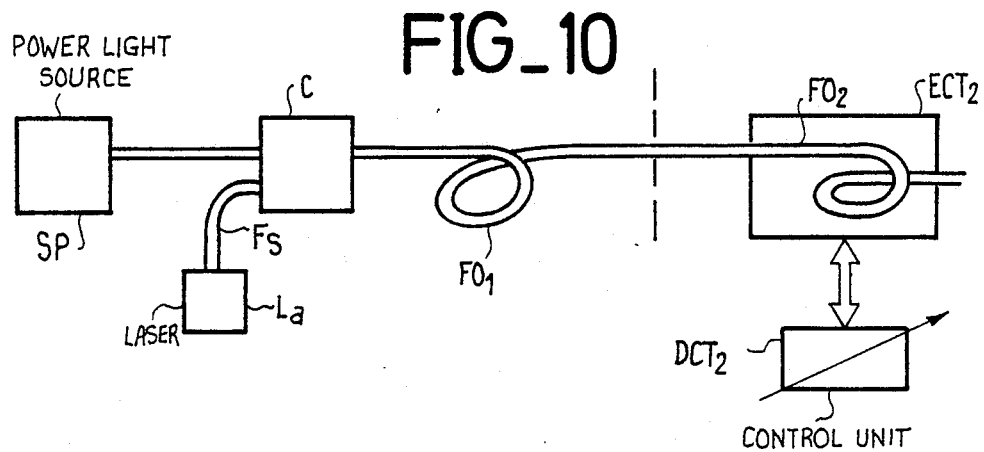
FIG_10
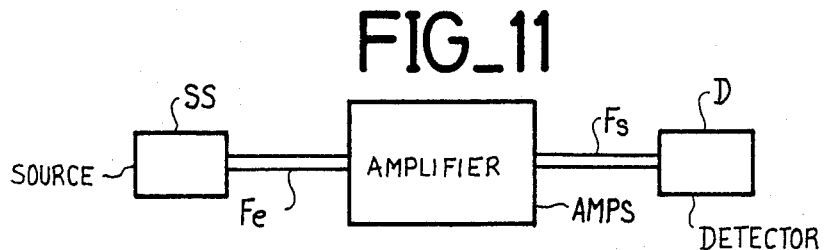
FIG_11
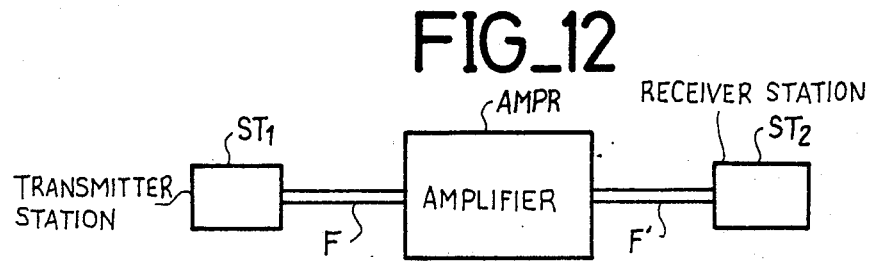
FIG_12

MONOMODE OPTICAL SOURCE AND AN OPTICAL AMPLIFYING DEVICE TUNEABLE IN THE NEAR INFRA RED AND APPLICATION TO SELECTIVE AND REGENERATION AMPLIFYING DEVICES

This is a continuation of Ser. No. 797,519, filed 11/13/85, now abandoned.

BACKGROUND OF THE INVENTION

1. Field of the Invention

The present invention relates to a monomode optical source and an amplifying device continually tuneable in the near infra red.

2. Description of the Prior Art

In many applications: spectroscopy, characterization of optical components, etc. . . . ; it is necessary to have a variable wave length optical source of high brilliancy.

For constructing such a source, one of the techniques usually used is that of the non linear parametric oscillator which uses a pump wave produced by a laser and the order two non linear effect in a corresponding crystal, for example lithium niobate: $LiNbO_3$. This type of source raises numerous problems such as those concerning the quality of the beam and the repeatability of the results.

Another possibility is that of using colored center lasers. This type of source has the disadvantage of requiring the frequent regeneration of the crystals used as active medium.

Finally, recently, multiwave length sources have been formed by using the Raman effect stimulated in the optical fibers. However, with this type of source, only a given number of possible wave lengths can be obtained, which wave lengths are fixed once and for all by the Raman diffusion process characteristic of the vibrational modes of the material used for forming the optical fiber.

One of the most important applications for optical fibers is the optical transmission of data, of digital or analog type. In this type of application, the optical fibers form the connecting channel between emitting members or sources and receiving members.

It is particularly important, especially for long distance optical connections, to reduce as much as possible the transmission losses. The origin of the losses is varied: nature of the optical fiber used, connection, etc. . . . For wide band and/or long distance connections, monomode optical fibers are used. The wave length used must also be taken into account. The lowest attenuation occurs for wave lengths centered about 1.5 μm, i.e. in the near infra red range.

It is therefore advantageous to use radiation sources emitting at a wave length close to this value.

The aim of the invention is to respond to this need while overcoming the drawbacks of the prior art.

SUMMARY OF THE INVENTION

The invention provides then a tuneable monomode optical source of the type using a four photon non linear effect by interaction resulting from high confinement of a wave, called pump wave, of a first wave length injected into a monomode optical fiber of given length situated in a spectrum of the near infra red wave lengths; comprising a generator of said pump wave, optical means for coupling with the generated wave with an input face of the optical fiber; further comprising a thermostatcontrolled enclosure in which is disposed at least a section of said optical fiber of given length and control means for continuous variation of the temperature of this enclosure so as to make the source continuously tuneable in said infra red wave length spectrum.

The invention further provides a tuneable optical amplifier of the type using a four photon non linear effect by interaction resulting from high confinement of a wave, called pump wave, of a first wave length, injected into a monomode optical fiber of given length, and coupling with a so called signal wave, of a second wave length, wave length situated in a spectrum of the near infra red wave lengths; comprising a generator of said pump wave, a generator of said signal wave and optical means for coupling said waves; a thermostat controlled enclosure in which is disposed at least a section of said optical fiber of a given length and control means for continuous variation of the temperature of said enclosure so as to make the device continuously tuneable in said infra red wave length spectrum.

BRIEF DESCRIPTION OF THE DRAWINGS

The invention will be better understood and other advantages and features will be clear from the following description with reference to the accompanying Figures in which:

FIGS. 1 and 2 are diagrams illustrating the phase tuning conditions as a function of the temperature for a first type of monomode optical fiber, FIG. 3 illustrates the optical refraction index profile for a second type of monomode optical fiber, of the type with buried sheath;

FIG. 4 is a diagram illustrating phase tuning conditions as a function of the temperature for this type of optical fiber;

FIG. 5 illustrates schematically a tuneable monomode optical source in accordance with the invention:

FIG. 6 is a continuously tuneable optical amplifying device in accordance with the invention;

FIG. 7 is a diagram illustrating the wave length spectrum obtained with a tuneable source in accordance with the invention for different temperatures;

FIGS. 8 to 10 illustrate various embodiments of devices of the invention;

FIG. 11 illustrates the application of a device of the invention in a selective frequency amplification device;

FIG. 12 illustrates the application of a device of the invention in a device for amplifying and regenerating signals transmitted by an optical fiber channel,

DESCRIPTION OF THE PREFERRED EMBODIMENTS

The optical fiber is of the standard monomode transmission fiber type, i.e. non birefringent.

The monomode optical source of the invention uses a non linear inter-reaction resulting from high confinement of a very powerful pump wave propagating in a monomode optical fiber. More precisely, use is made of a four photon non linear effect.

It is useful first of all to recall the physical phenomena brought into play.

The non linear reaction resulting from high confinement of a pump wave propagating in a monomode optical fiber of great length allows waves to be generated of frequencies $\gamma_S$ and $\gamma_{AS}$; $\gamma_S$ being known under the name of Stokes wave or signal: $\gamma_{AS}$ under the name of anti-Stokes or Idler wave.

This parametric four photon mixing process can only be kept going if the energy conservation and phase tuning conditions are achieved simultaneously, which comes down to the relationship:

$$2\omega_p - \omega_S \omega_{AS} = 0 \tag{1}$$

in which relationship, AS, S and P are the indices associated with "anti-Stokes", "Stokes" and "pump".

$$\Delta K = K_{AS} + K_X - 2K_p = 0 \tag{2}$$

where $$\Delta K = \Delta K_M + \Delta K_W \tag{3}$$

in which relationships $\Delta K_M$ characterizes the phase detuning linked to the dispersive properties of the basic material forming the fiber and $\Delta K_W$ is related to the mode of dispersion properties tied up with the structure of the guide. In monomode optical fibers, this parameter is related to the index profile, to the position of the cut off wave length $\lambda_c$ with respect to the pump wave length and to the index difference between the core and sheath materials.

The expressions $\Delta K_M$ and $\Delta K_W$ may be related to the optogeometrical characteristics of the fiber via the following relationships:

$$\Delta K_M = \frac{1}{C}(n_{AS}\omega_{AS} + n_S\omega_S - 2n_p\omega_p) \tag{4}$$

$$K_W = \frac{\Delta n}{C}(B_{AS}\omega_{AS} + B_S\omega_S - 2B_p\omega_p) \tag{5}$$

where:

$$B_i = \frac{(\beta_i^2 C^2/\omega_i^2) - n_2^2(\omega_i)}{n_1^2(\omega_i) - n_2^2(\omega_i)} \tag{6}$$

in which relationships $n_i$ represents the absolute values of the optical indices at the wave lengths $\lambda_i$; $\beta_i$ the longitudinal wave vectors; $B_i$ the values of the standardized propagation constant of the modes for each wave length $\lambda_p, \lambda_S, \lambda_{AS}$; $\omega_i$ is the characteristic angular frequency of each wave length $k_i = \omega_i/C - 2\pi/\lambda$; $k_i$ being the associated wave vector and C the speed of light.

For weakly doped silica, the condition $\Delta K_M = 0$ may be achieved by using a pump wave length situated close to the wave length of zero chromatic dispersion. This wave length is between 1.273 micrometers (pure silica) and 1.31 micrometers (germanium oxide doped silica).

By positioning the cut off wave length $\lambda_c$ with respect to this characteristic wave length of the material, the condition $\Delta K_W = 0$ can be achieved for discrete wave lengths satisfying the condition (1).

The parameters $B_i$ are related to the optogeometrical characteristics of the fiber by the relationship:

$$B_i = 1 - \frac{U_i^2}{V_i^2} \tag{7}$$

in which $V_i$ are the standardized frequencies of the modes and are related to the core radius of the optical fiber, to the index differences and to the wave lengths of the electromagnetic waves by the relationship:

$$V_i = \frac{2\pi a}{\lambda_i}\sqrt{n_1^2(\omega_i) - n_2^2(\omega_i)} \tag{8}$$

in which $u_i$ represents the transverse components of the longitudinal wave vectors $\beta_i$, in the core of the and satisfy the equation with characteristic values:

$$u\frac{J_1(u)}{J_0(u)} - (V^2 - u^2)^{\frac{1}{2}}\frac{K_1(V^2 - u^2)^{\frac{1}{2}}}{K_0(V^2 - u^2)^{\frac{1}{2}}} = 0 \tag{9}$$

in which $J_1, J_0, K_1, K_0$ are Bessel and modified Bessel functions of order 1 and 0.

It is known that a modification of the temperature of the materials forming the wave guide results in a variation of the absorption bands in the U.V. part of the spectrum. These absorption bands follow the empirical law of Urbach.

In the infra red range, such variations may also be observed, corresponding to a modification of the multiphonon absorption process.

Now, such variations of the absorption bands result in a variation of the dispersion properties of the optical indices.

Furthermore, a modification of the geometrical parameters or of the optical indices results in a variation of the parameters $B_i$. These are two combined effects which modify the phase tuning conditions.

The invention takes advantage of this visible phenomenon in a way which will be discussed further on.

The effects of the variations of the temperature on the optical index will first of all be considered.

The optical index of a medium of binary composition may be written:

$$n_1^2(\lambda_1 T) = 1 + G_1(\lambda_1 T)g_1 + G_2(\lambda_1 T)g_2 \tag{10}$$

in which:

$$g_1 + g_2 = 1 \tag{11}$$

and $G_2(\lambda, T)$ and $G_1(\lambda, T)$ are chromatic dispersion factors of the basic material and of this latter in the presence of a doping agent. $g_2$ and $g_1$ represent the molar concentrations of the basic material and of the dope and are between 0 and 1.

A temperature variation may therefore affect the values of the indices of the materials, which may be written:

$$n_1(\lambda, T) = n_1(\lambda, T_o) + (T - T_o)\frac{dn_1}{dT} \tag{12}$$

where:

$$\frac{dn_1}{dT} = \frac{1}{2n_1}\left(g_1\frac{dG_1}{dT} + (1 - g_1)\frac{dG_2}{dT}\right) \tag{13}$$

Since the effect of the temperature on the si is naturally obtained from the expression:

$$\frac{dn_2}{dT} = \frac{1}{2n_2}\frac{dG_2}{dT} \tag{14}$$

A variation of the temperature also results in modifying the optogeometric parameters of the fiber which will result in a modification of the values of the standardized propagation constants. By taking up again the preceding notations, the following relationship describes this variation:

$$B(T, V) = B(T_0, V) + dB/dT \Delta T \quad (15)$$

in which:

$$\frac{dB}{dT} = \left(\frac{d(VB)}{dV} - B\right)\left[\frac{1}{a}\frac{da}{dT} + \frac{1}{(n_1^2 - n_2^2)}\left(n_1\frac{dn_1}{dT} - n_2\frac{dn_2}{dT}\right)\right] \quad (16)$$

This relationship may be simplified by the following approximations:

$\frac{dn_1}{dT} \simeq \frac{dn_2}{dT}$ and $n_1 \simeq n_2$, whereby:

$$\frac{dB}{dT} = \left(\frac{d(VB)}{dV} = B\right)\left(\frac{1}{a}\frac{da}{dT} + \frac{1}{2n_1}\frac{dn_1}{dT}\right) \quad (17)$$

To give an idea, digital values have been shown on the diagrams of FIGS. 1 and 2 illustrating the influence of temperature variations on the variation of frequency $\Delta\gamma$. FIG. 1 shows the phase tuning conditions as a function of the temperature and of the optogeometric parameters associated with a monomode optical fiber: the cut off wave length $\lambda_c$, the diameter of core a and the variation of the optical index $\Delta n$ between the core and the optical sheath, the fiber being of the index jump type.

More precisely, the axis of the ordinates shows the variations of frequency $\Delta\gamma$ in $cm^{-1}$ as a function of the temperature with, as parameter, the cut off wave length $\lambda c$.

In FIG. 1 four curves are shown corresponding to cut off wave lengths equal to 1.2 micrometer; 1.225 micrometer; 1.25 micrometer, and 1.275 micrometer. The other parameters are fixed. The molar concentration of dopes, i.e. germanium dioxide, was 3%, the index jump $\Delta n$ was $4.18 \times 10^{-3}$ and the pump wave length was $\lambda_p = 1.319$ micrometer.

It can be seen that, for these values, a temperature variation between $-20°$ and $100°$ C. allows tuning of the source to be obtained in a range extending over $500 cm^{-1}$.

Curves could also be constructed showing the variation of frequency in $cm^{-1}$ as a function of the temperature with, as parameter, the optical index variation.

Calculations show that the slope $\Delta\gamma/\Delta T$ is all the higher the smaller the index difference and that the cut off wave length is close to the pump wave length.

FIG. 2 shows the variation of the frequency as a function of the temperature with, as parameter, the pump wave length. In this Figure three pumps have been shown corresponding to three pump wave lengths equal respectively to 1.318 micrometer; 1.319 micrometer and 1.32 micrometer. The cut off wave length was fixed at 1.225 micrometer, the molecular percentage of germanium dioxide at 3%, the index jump $\Delta n$ equal to $4.179 \times 10^{-3}$ and the body of the optical fiber had a diameter a equal to 4.2586 micrometer.

Fibers having more complex structures than those with stepped profile and double indices may also be used. These are for example monomode optical fibers with buried sheath. These fibers are situated, because of their property, between the double index type fibers an those with a "w" profile. The sheath is generally formed by inserting fluoride with the silica during the deposition operation, which results in lowering the index of the basic material. For such fibers, there are three parameters which govern the establishment of the monomode propagation conditions, namely: the core-sheath and optical sheath-tube index differences and the width of the sheath related to the core radius.

FIG. 3 shows schematically the variations of the index profile n as a function of the distance R from the axis of revolution of the optical fiber. This fiber is characterized by three different indices $n_1$, called core index, $n_2$, optical sheath index and $n_3$ index of the support tube. The diameter of the core is equal to $2a$ and the outer diameter of the optical sheath equal to $2b$.

FIG. 4 illustrates the variations of the frequency $\Delta\gamma$ in $cm^{-1}$ as a function of the temperature T in °C. with, for parameter, the cut off wave length $\lambda c$. In this FIG. 4 are shown three curves corresponding to $\lambda c = 1.1$ micrometer; 1.15 micrometer and 1.2 micrometer. The optical index difference $\Delta n_1 = n_1 - n_2$ was equal to $7.0710^{-3}$; the index difference $\Delta n_2 = n_3 - n_2$ was equal to $1.7810^{-3}$; the ratio between the radii b and a was equal to 5; and the pump wave was equal to 1.319 micrometer.

The invention takes advantage of the physical phenomena which have just been recalled.

FIG. 5 illustrates schematically a monomode optical source continuously tuneable in the near infra red in accordance with the invention.

It comprises a power source SP for generating the pump wave. The wave generated by this source is injected through optical coupling means C into an optical fiber FO of given length, in which the above described non linear interaction takes place.

FIG. 6 illustrates schematically an optical amplifying device continuously tuneable in the near infra red in accordance with the invention.

It comprises a power source SP for generating the pump wave as in the case of the source shown in FIG. 5 and a source La or signal wave source. The waves generated by these two sources are both injected through optical coupling means C into an optical fiber FO of given length, in which the above described non linear reaction takes place.

The coupling means C comprise in the example illustrated, two lenses $L_1$ and $L_2$ associated respectively with the pump SP and signal La sources. These lenses couple the sources to a dichroic mirror MD whose coefficient of reflection is maximum for a wave length centered for example on 1.5 $\mu m$, the wave length emitted by the signal source La. A third lens $L_3$ is provided optically coupling the two beams from sources La and SP to the input face of the optical fiber FO.

In one embodiment, the pump source SP is formed by a laser Yag emitting radiations centered on the wave length 1.319 micrometers and the signal source La is formed by a semiconductor laser diode. The lenses $L_1$ to $L_3$ must be formed from a material transparent in the range of wave lengths emitted by the sources for example silicon. A typical interraction length of the optical fiber FO is about 30 meters. The laser Yag emits with a peak power typically in the range 60 to 100 watts.

According to the essential characteristic of the invention, the optical fiber FO is disposed in a thermal enclosure ECT able to be temperature regulated by means of a control device DCT.

In agreement with what has just been discussed, this arrangement, essential to the invention, by fixing the temperature of the enclosure ECT, i.e. also of the part of fiber FO included in the enclosure, allows the new frequencies generated to be modified at will in a continuously variable way and over a large range, in the case of the source described with reference to FIG. 5 or allows the amplifying device described with reference to FIG. 6 to be tuned to a given reaction.

Typically, the thermal enclosure will have to allow temperature variations in the range −20° C. to +100° C.

The diagram of FIG. 7 is a diagram of the wave lengths obtained for three different temperatures T: −19° C., 0° C. and 100° C. in the case of the tuneable source of FIG. 5. More precisely, the vertical axis shows the optical intensity in relative arbitrary units and the horizontal axis the wave length in micrometers.

In the diagram of FIG. 7, apart from the line of high powered radiations emitted by the pump source SP, of wave length $\lambda_p = 1.319$ micrometers, we find on each side of this line, for T = −19° C., lines centered on wave lengths $\lambda = 1.4$ micrometer and $\lambda' = 1.25$ micrometer; for T = 0° C., lines centered on the wave lengths $\lambda = 1.41$ micrometer and $\lambda = 1.227$ micrometer; and for T = 100° C. lines centered on the wave length $\lambda = 1.475$ micrometer and $\lambda' = 1.979$ micrometer.

Due to a longitudinal distribution of the phase tuning these lines represent naturally a much less narrow spectrum than that shown by the line emitted by the pump source.

It is of course possible to replace the coupling means, the lenses $L_1$ to $L_3$ as well as the dichroic mirror MD shown in FIG. 5, by more compact means, for example an optical fiber coupler.

Such a construction is shown in FIG. 8. The coupler C comprises two optical fiber sections $F_1$ and $F_2$. In a common region, these two sections have been stripped and polishing has been carried out in this stripped region so as to form a flat diopter. The flat diopters of the two optical fiber sections $F_1$ and $F_2$ are joined together.

The signal source La is optically coupled to one of the branches of the coupler, the fiber section $F_1$ in FIG. 8, by a fiber leader $F_S$, and the pump source SP is coupled to the other branch, section $F_2$, by means of a second fiber leader $F_P$.

Fiber FO is coupled to the second end of the optical fiber section $F_1$. As before, this optical fiber FO is disposed in a thermostat controlled enclosure ECT, temperature controlled by the control device DCT.

To obtain a marked non linear effect, the power emitted by the pump source must be all the higher the smaller the interaction length, i.e. the length of the optical fiber FO. This optical fiber length may of course be increased. However, such increase is limited by different parasite phenomena which lead, particularly as has been pointed out during the description of the diagram of FIG. 7, to an enlargement of the line spectra. In practice, the interaction length is limited to a few tens of meters, typically to a length of the order of 30 m. Under these conditions, as was mentioned, the peak power emitted by the pump source must be in the range 60 to 100 watts.

In additional variants of the invention, it is however possible to increase this interaction length without deteriorating the useful signal emitted.

In FIG. 9 a first variant has been shown for increasing the interaction length. For this, the optical fiber in which the non linear interaction takes place is divided into two sections $FO_l$ and $FO_2$ each placed in separate thermostat controlled enclosures, $ECT_1$ and $ECT_2$. Each enclosure is temperature controlled separately by means of a device associated therewith, respectively $DCT_1$ and $DCT_2$. In actual fact, there are not two separate fibers disposed in cascade but one fiber of a continuous length. The important thing is to be able to bring each fiber section to a separate temperature. Thus it is possible to increase the interaction length while at the same time compensating for the inhomogeneities of the optogeometric parameters of the optical fiber in which the non linear interaction takes place. The power of the pump source required is then divided by two, if the two sections $FO_1$ and $FO_2$ are of equal length thus doubling the interaction length thereof. Naturally, the number of sections is not limited to two. However, for a greater number, it becomes difficult to correctly adjust the different temperatures of the enclosures. Two to three sections form a realistic number.

Some laser diodes, for example distributed network laser diodes, have the advantageous property of emitting at a very precise frequency, which frequency is finely controllable at the time of manufacture. These diodes are of the so called "DFB" type.

The invention also advantageously applies in this case. For this, the architecture which has just been described with reference to FIG. 9 is kept, and in particular the optical fiber in which the non linear action is provided is divided into two sections. As opposed to the device described in this Figure, a single one of the sections, for example section $FO_2$, is disposed inside a thermostat controlled enclosure $ECT_2$. The other elements are identical to those of FIG. 9 and will not be described again.

In this second variant, described with reference to FIG. 10, the interaction length is also increased but the purpose of the thermostat controlled enclosure is in this case to tune the second section to the natural conditions of the first fiber, which conditions depend on the different optogeometric parameters which were recalled above.

The devices in accordance with the invention are susceptible of different types of application in the optical channel telecommunications field.

A first category of applications is naturally the use of the device such as it is as source or optical amplifying device tuneable to a given wave length. It is pointless to come back to these applications which are clear from what has been described with reference more especially to FIGS. 5 to 10.

A second category of applications is the use of the device of the invention as selective amplifier. In fact, for a given temperature T, the non linear interaction process can only be sustained if the energy conservation and phase tuning conditions, such as is apparent from relationships (1), and (2) are achieved. Since the frequency of the pump signal is fixed, a precise signal frequency is required.

FIG. 11 illustrates schematically a selective amplification device using a device in accordance with the invention. The selective amplifier bears the general reference AMPS and comprises more especially the pump wave generator. This amplifier receives a signal emitted by an optical source SS coupled optically, for example by means of an input optical fiber $F_e$, to the selective amplifier AMPS. This amplifier may be formed in accordance with one of the configurations shown in FIGS. 5 to 10. By way of example, if we take the configuration shown in FIG. 9, the optical fiber $F_s$ is optically coupled to the output face of branch $F_{02}$ and to a detector D.

This type of selective amplifier, using an amplifying device continuously tuneable in accordance with the invention, has the further advantageous characteristic of being very rapid. The response time is typically of the order of a picosecond.

A third category of applications which may be considered for a device of the invention is its use as regenerating amplifier inserted in an optical fiber connection channel.

FIG. 12 shows schematically a device of this type.

An optical fiber connection is formed between a transmitting station, $ST_1$, and a receiving station $ST_2$. An amplifying and regenerating device AMPR is inserted in the connection, i.e. in the example illustrated between two fiber sections F and F'.

This regenerating amplifier AMPR is also formed, for this application, by a continuously tuneable amplifying device in accordance with the invention.

The amplifying device comprises all the elements described before with reference to one of FIGS. 9 to 10, more particularly a pump source and at least one optical fiber section in which the non linear interaction takes place, which section is disposed in a thermostat controlled enclosure controlled by a temperature control device.

More precisely, if we take the configuration shown in FIG. 9, the optical fiber F of FIG. 12 plays the role of the optical fiber $F_S$ of FIG. 9. The signal source La in FIG. 9 is, for the application shown in FIG. 12, disposed in the transmitting station $ST_1$. The optical fiber F' (FIG. 12) is optically coupled to the output, branch $F_2$, of the coupler C of FIG. 9.

The invention is not limited to the sole concrete embodiments shown with reference to FIGS. 5 to 12, but extends to all variations within the scope of a man skilled in the art.

What is claimed is:

1. A tuneable monomode optical source of the type using a four photon non-linear effect by interaction resulting from a pump wave, of a first wavelength substantially equal to the wavelength which provides zero chromatic dispersion, injected into a monomode optical fiber of given length situated in a spectrum of the near infra red wavelengths, comprising:
    a generator of said pump wave including a means for positioning the cutoff wavelength with respect to said wavelength of zero chromatic dispersion in order to minimize dispersion properties for discrete wavelengths,
    optical means for coupling the wave generated with an input face of the optical fiber;
    a thermostat controlled enclosure in which is disposed at least one section of said optical fiber of given length and means for controlling a continuous variation of the temperature of said enclosure so as to make the source continuously tuneable in said infra red wave length spectrum.

2. A tuneable optical amplifying device of the type using a four photon non-linear effect by interaction resulting from a pump wave, of a first wavelength substantially equal to the wavelength producing zero chromatic dispersion, injected into a monomode optical fiber of given length, and coupling with a so called signal wave, of a second wavelength, which wavelengths are situated in a near infra red wavelength spectrum, comprising:
    a generator of said pump wave including a means for positioning the cutoff wavelength with respect to said wavelength of zero chromatic dispersion in order to minimize dispersion properties,
    a generator of said signal wave and optical means for coupling said waves;
    a thermostat controlled enclosure in which is disposed at least one section of said optical fiber of given length and continuous variation control means for controlling the temperature of said enclosure so as to make said device continuously tuneable in said infra red wave length spectrum.

3. The device as claimed in claim 2, wherein said coupler is a twin optical fiber coupler receiving respectively the source wave and the pump wave.

4. The device as claimed in claim 3, wherein said pump wave generated is a Yag laser emitting at a wave length centered on 1.319 micrometer.

5. The device as claimed in claim 3, wherein said signal wave generator is a laser diode.

6. The device as claimed in claim 5 wherein said optical fiber of given length is divided into sections and comprising a thermostat controlled enclosure associated with separate temperature control means for each section.

7. The device as claimed in claim 5, wherein, with said signal wave generator transmitting controllable length radiations, said fiber of given length comprises a first section and a second section and wherein one of said sections is disposed in a thermostat controlled enclosure so as to tune said section to the natural optogeometric parameters of the other section.

8. The device as claimed in claim 7, wherein said means for controlling the temperature of each thermostat controlled enclosure impose in a continuously variable way a temperature in the range extending from $-20°$ C. to $+100°$ C.

* * * * *